US008404069B2

(12) United States Patent
Douglas

(10) Patent No.: US 8,404,069 B2
(45) Date of Patent: Mar. 26, 2013

(54) METHOD AND APPARATUS FOR AUTOMATED STACKING OF SHEET MATERIAL BUNDLES

(75) Inventor: Bruce Foster Douglas, Zionsville, IN (US)

(73) Assignee: Firestone Building Products Company, LLC, Indianapolis, IN (US)

( * ) Notice: Subject to any disclaimer, the term of this patent is extended or adjusted under 35 U.S.C. 154(b) by 353 days.

(21) Appl. No.: 12/696,405

(22) Filed: Jan. 29, 2010

(65) Prior Publication Data

US 2010/0192740 A1 Aug. 5, 2010

Related U.S. Application Data

(60) Provisional application No. 61/148,558, filed on Jan. 30, 2009.

(51) Int. Cl.
*B32B 38/00* (2006.01)
*B32B 38/04* (2006.01)
*B32B 38/18* (2006.01)

(52) U.S. Cl. ........ 156/265; 156/250; 156/256; 156/264; 156/269; 156/270

(58) Field of Classification Search .................. 156/250, 156/256, 264, 265, 269, 270, 512, 516, 517, 156/523, 524, 525; 83/28; 414/788.1, 802
See application file for complete search history.

(56) References Cited

U.S. PATENT DOCUMENTS 3,387,719 A * 6/1968 Moore ........................ 414/788.4
3,872,962 A 3/1975 de Ligt et al.
5,080,154 A 1/1992 Kallesoe
5,141,109 A 8/1992 Bergeron, Sr.
5,417,038 A 5/1995 Babel
5,630,900 A * 5/1997 Huang .......................... 156/227
5,873,460 A 2/1999 Reinhardt
6,615,565 B2 9/2003 Dekker
7,243,484 B2 7/2007 Allwein

* cited by examiner

*Primary Examiner* — Mark A Osele
*Assistant Examiner* — Christopher C Caillouet
(74) *Attorney, Agent, or Firm* — Jason A. Houser; Arthur M. Reginelli

(57) ABSTRACT

A method and apparatus for preparing a bundle of sheet material for transport. The automated apparatus includes a cutting assembly for cutting slats, or spacers, from scrap sheet material, a pick and place assembly for positioning and securing the slats to the underside of a bundle, and a stacking assembly for stacking bundles prior to removal for shipping or storage. The slats, once cut, are automatically placed in guide channels and then positioned beneath the bundle while glue is applied thereto. The glued edges are then automatically pressed against the bundle to secure the slats to the bundle, thereby creating space beneath the bundle to allow a forklift to manipulate the bundles.

18 Claims, 5 Drawing Sheets

METHOD AND APPARATUS FOR AUTOMATED STACKING OF SHEET MATERIAL BUNDLES

This application claims priority from U.S. provisional patent application Ser. No. 61/148,558 filed on Jan. 30, 2009, which is incorporated herein by reference in its entirety.

FIELD OF THE INVENTION

One or more embodiments of the present invention relate to an automated method and apparatus for stacking bundles of sheet material at the end of a sheet material manufacturing line. The automated method may include using scrap sheet material to create slats that are secured to the bottom of the bundles. In other embodiments of the present invention the automated method may include the stacking of two or more bundles for storage and shipment.

BACKGROUND OF THE INVENTION

Sheet materials, such as foam insulation board, for example, are typically stored and shipped in bundles of stacked sheets. This method of storage and shipment is efficient, and, in the case of foam insulation board, also helps to protect the sheets, which alone may not have sufficient strength to be handled without causing damage to the sheet. The foam insulation sheets are usually approximately four feet (1.2 m) wide, and may range in length from approximately 4 feet to 8 feet (1.2-2.4 m). These sheets may come in a variety of thicknesses, ranging from about 0.5 inches to about 4.5 inches (13-114 mm).

Due to the size and weight of the bundles of sheet material, they must be moved by forklifts during storage and shipment. Two or more bundles are sometimes stacked together to allow a forklift to move multiple bundles of the sheet material at one time. In order for the forklifts to be able to lift and move the bundles it is necessary to provide spacers, or slats, on the bottom of each bundle, thereby creating a space for the forks of the forklift to slide beneath the bundle. In the case of foam insulation board, scrap insulation board is often used to make the spacers for the bottom of the bundles. However, the existing, largely manual methods used to cut the scrap insulation board into suitably sized spacers and to apply the spacers to the bottom of the bundles are inefficient and labor intensive.

Conventionally, a piece of scrap insulation board has been fed through a gang saw in order to create spacers, also referred to as slats, of the appropriate size. The gang saw includes multiple parallel saw blades and makes multiple cuts simultaneously. While this method of cutting the slats is somewhat effective in generating a large number of slats quickly, it also creates a significant amount of dust each time a piece of scrap insulation board is fed through the saw. In addition, the slats must then be removed from the gang saw manually and placed into a storage area until applied to the bundles of insulation board.

Application of the slats created by the gang saw to the bundles is accomplished by applying glue to one edge of each slat. The glued edge of each slat is then pressed against the bottom surface of an insulation board bundle, thereby creating the necessary spacers to facilitate transport of the bundle by a forklift. Both the step of gluing the edges of the slats, as well as the application of the slats to the bundles, has conventionally been performed manually by one or more workers. Thus, a worker manually applies a bead of glue to one edge of each slat, then must press and hold the slat against the bottom of an insulation board bundle until the glue has dried sufficiently to retain the slat in place. This manual process is both time consuming and labor intensive.

In addition, each bundle must be picked up individually by a forklift operator and, if desired, stacked on another bundle or positioned next to another bundle so that multiple bundles may be moved simultaneously. This also adds valuable time to the process due to the additional work required of the forklift operator.

There is therefore a need to improve upon the methods of cutting and applying slats to bundles of sheet materials, and of preparing the bundles for transport; particularly bundles of foam insulation board.

SUMMARY OF THE INVENTION

One or more embodiments of the present invention provide an automated process of preparing a bundle of sheet material for transport comprising: automatically cutting a slat from a piece of material; automatically moving the slat into a guide channel; automatically applying glue to the slat; automatically positioning the slat under a bundle of sheet material; automatically pressing the glued surface of the slat against the bottom of the bundle.

One or more embodiments of the present invention also provides an automated method of preparing stacked sheet material for transport comprising: providing a piece of a material; providing a bundle of stacked sheet material; automatically cutting slats from the piece of a material; automatically placing the slats into one of a plurality of guide channels; automatically applying glue to an edge of the slats; automatically positioning the slats under the bundle; and automatically pressing the glued edge of the slat against the bottom of the bundle.

One or more embodiments of the present invention also provides an automated apparatus for preparing a bundle of sheet material for transport comprising: a cutting assembly including a feed conveyor and a saw adapted to cut slats from sheet material; and a pick and place assembly including a placement device adapted to pick up and move the cut slats, guide channels, glue heads, and a conveyor having vertically movable channels.

DETAILED DESCRIPTION OF THE ILLUSTRATIVE EMBODIMENTS

Figure 1:
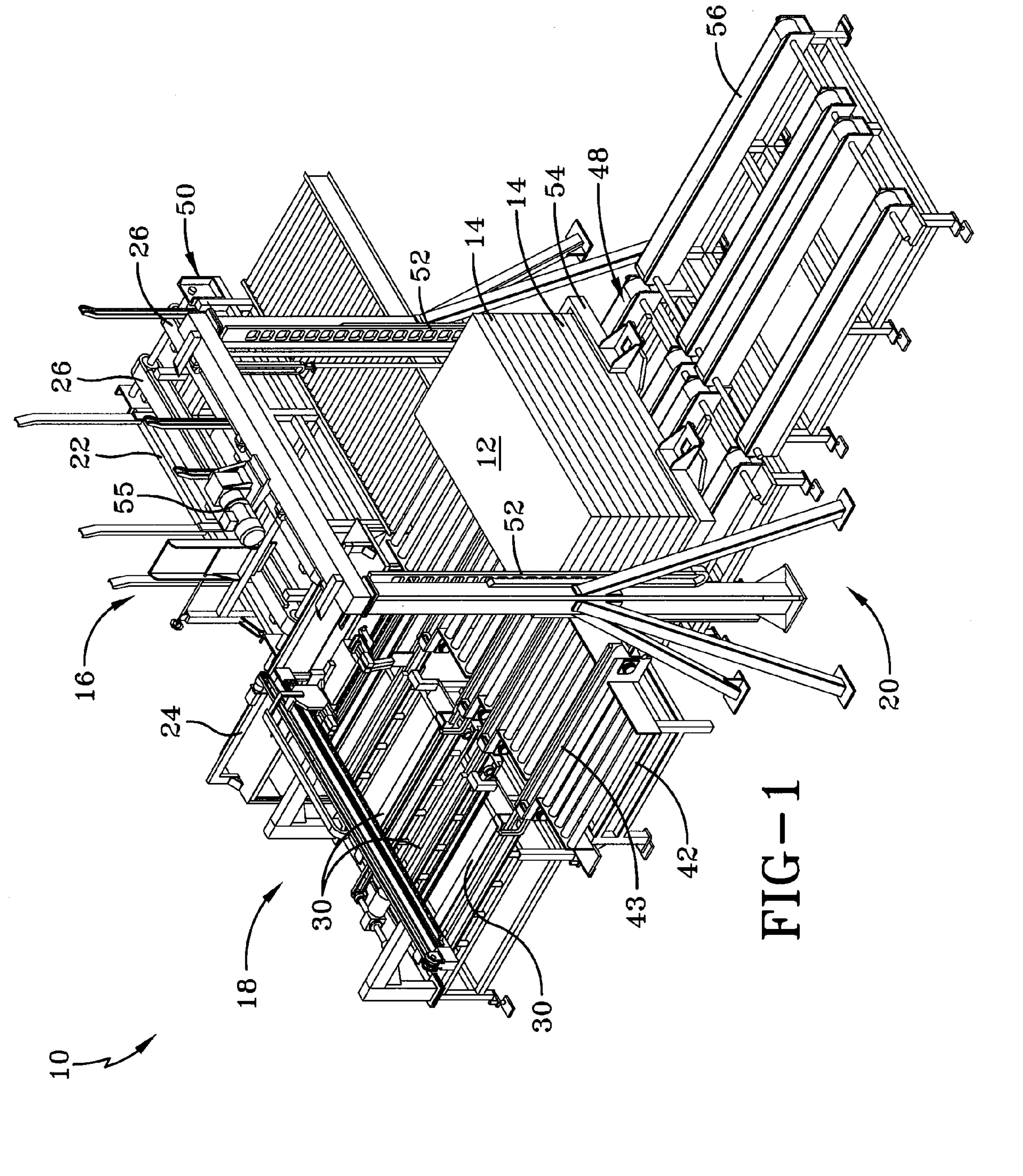
FIG. 1 is a perspective view of an automated stacking assembly according to the present invention depicted at the end of a sheet material production line.

Referring now to FIG. 1, an automated stacking assembly is shown, and is generally indicated by the numeral 10. Automated bundle processing assembly 10 may be provided at the end of a sheet material production line, and may be integrated therewith to facilitate efficient removal of finished product from the production area. In one or more embodiments, automated stacking assembly may be provided at the end of a production line for foam insulation board. Foam insulation board, which may also be referred to as insulation boards or panels or boards, include those conventionally used in the construction industry, such as those adapted for use in flat or low-sloped roofs.

In one or more embodiments, the insulation boards are formed from light weight materials. In other embodiments, the insulation boards may include low density materials, wherein low density may be defined as a material having a density less than a solid. In one or more embodiments, the insulation boards include an isocyanate-based material. In still other embodiments, the insulation board may include polyurethane or polyisocyanurate. In still other embodiments, the insulation boards include closed cell foams. In one or more embodiments, a facer may be provided on one or both planar surfaces of the insulation board to add strength and promote water resistance. The facer may include a polymer-coated glass fiber to provide increased strength and water resistance characteristics.

While the invention is described herein with reference to insulation board, it should be appreciated that the method and apparatus described may be used in the manufacturing of any sheet material packaged for transport in bundles. For example, the method and apparatus disclosed may provide advantages in the production of drywall and plywood.

The insulation boards are packaged as a bundle 12 including a plurality of panels 14 stacked on top of one-another. Panels 14 may be packaged as a bundle 12 by any method known to those skilled in the art. For example, panels 14 may be secured as bundles 12 through the use of plastic or metal straps wrapped around the exterior of the bundle, or by wrapping a heat shrinkable material around the stacked panels 14 and then heating the material to secure panels 14 into a bundle 12. Panels 14 are supplied to automated bundle processing assembly 10 as packaged bundles 12. In one or more embodiments, panels 14 may have a length of approximately 48 in. (1.2 m), in other embodiments a length of approximately 88.5 in. (2.2 m), and in other embodiments a length of approximately 96 in. (2.4 m). In these or other embodiments, panels 14 may have a width of approximately 48 in. (1.2 m). In one or more embodiments, panels 14 may have a thickness of between approximately 0.5 inches and approximately 4.5 inches (13-114 mm).

Automated bundle processing assembly 10 includes a cutting assembly 16, a pick and place assembly 18, and a stacking assembly 20. Automated bundle processing assembly 10 is controlled by a control system (not shown), which causes each separate assembly to operate in conjunction with the others, creating an automated system substantially independent of manual intervention. The control system may include software capable of allowing an operator of the system to alter various aspects of the automated bundle processing assembly 10, as is well known in the art. For example, panels 14 of various sizes, in the form of bundles 12, may be accommodated by automated bundle processing assembly 10 by altering various settings within the control system. In one or more embodiments, sensors may be used within automated bundle processing assembly 10 to facilitate proper timing of the performance of various automated operations of the system.

Figure 5:
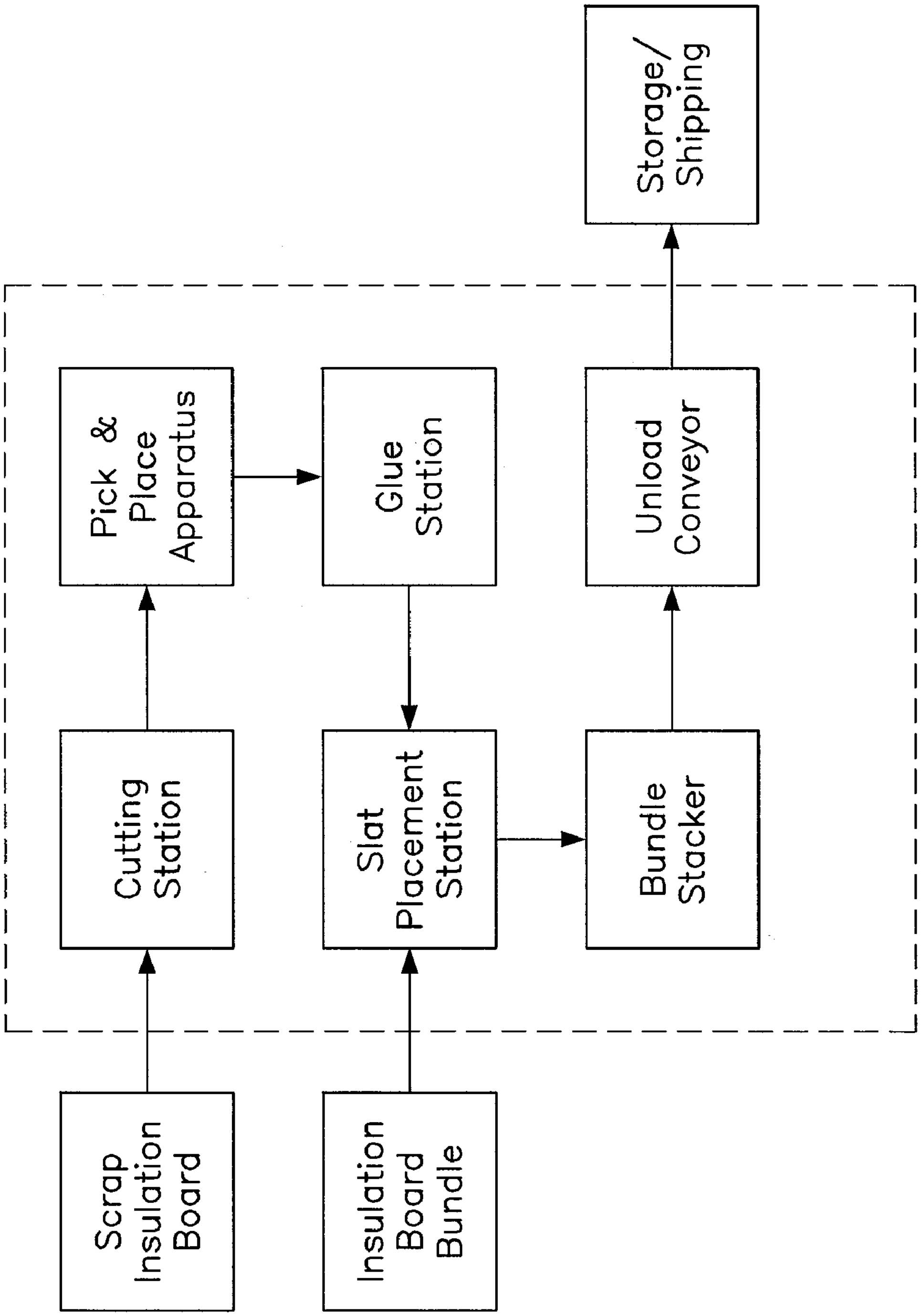
FIG. 5 is a flow chart of the method of preparing a bundle of sheet material for transport according to the present invention.

The automated bundle processing assembly 10 is adapted to automatically, meaning without significant manual intervention, cut slats from a scrap piece of insulation board, position the slats into guide channels, apply glue to an edge of the slats, position them under a bundle 12, secure the slats to the bottom surface of the bundle, and stack multiple bundles for quick and easy removal by a fork-lift operator (FIG. 5). The term slats, as used herein, refers to narrow strips of material used as spacers beneath bundles 12 to elevate them to receive forklifts.

Figure 4:
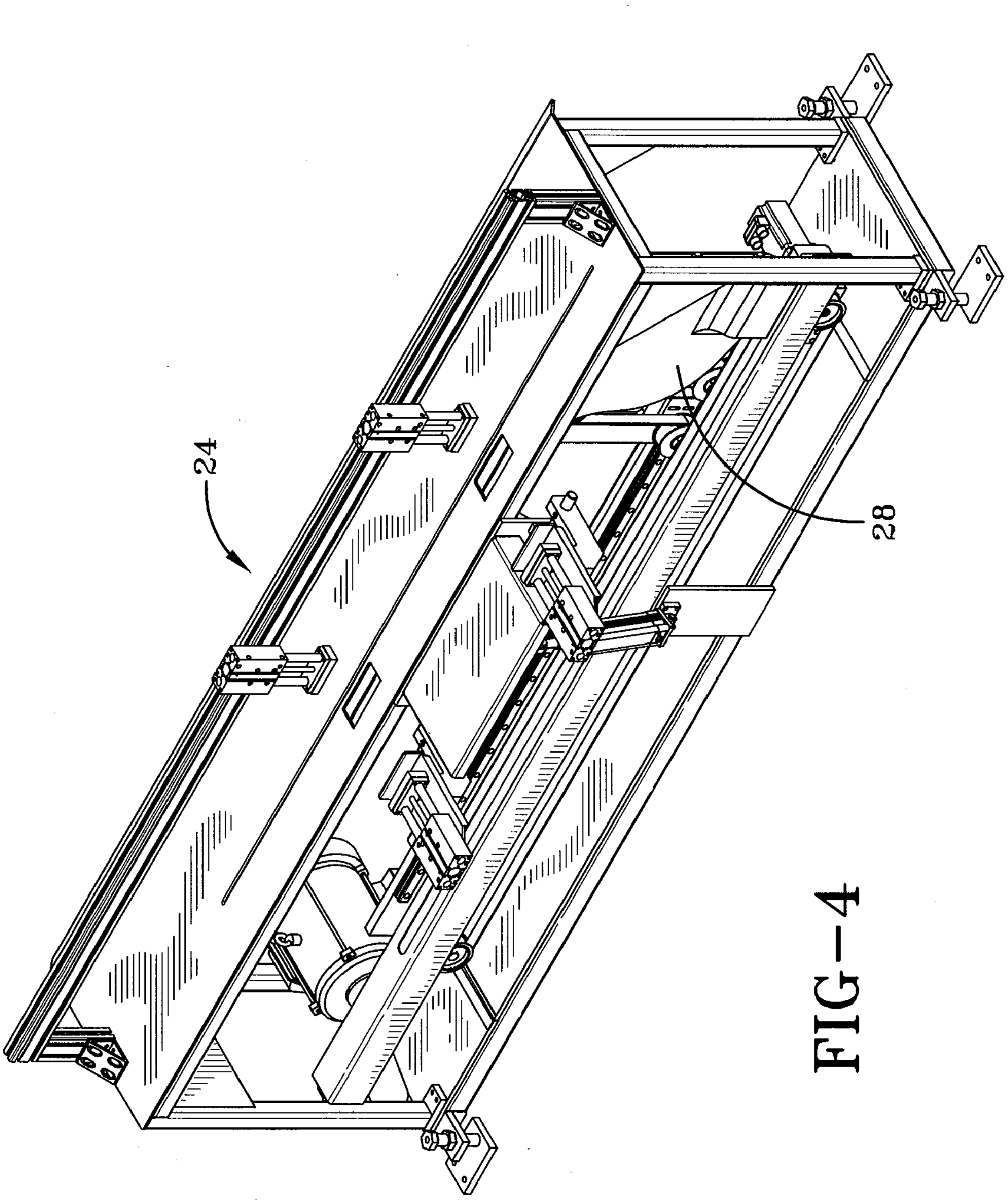
FIG. 4 is an enlarged perspective view showing a slat cutting saw according to at least one embodiment of the present invention.

In one or more embodiments, cutting assembly 16 includes a feed conveyor 22 positioned adjacent to a saw 24. Feed conveyor 22 may be any feed conveyor known to those skilled in the art, and adapted to drive an object located on the conveyor, such as a piece of scrap insulation board, toward saw 24. In one or more embodiments, feed conveyor 22 may include one or more powered belts 26 adapted to force a scrap insulation board thereon towards saw 24. In one or more embodiments, saw 24 may include a single cutting blade 28 configured to make a single cut per pass of the blade (See FIGS. 1 and 4). The blade 28 may be configured to cut in only a single linear direction, or, alternatively, may be configured to cut as it moves back and forth in two directions. In one or more embodiments, the frequency at which saw 24 makes cutting passes may be controlled by the control system, depending upon the speed at which the slats resulting from each cutting pass are needed. Thus, feed conveyor 22 continuously feeds scrap insulation board to saw 24, which cuts slats from the scrap insulation board. In one or more embodiments, scrap insulation board is placed on feed conveyor 22 manually, as needed. In other embodiments, a stack of scrap insulation board may be provided, which may be automatically drawn onto feed conveyor 22 when needed, as indicated by the control system.

In one or more embodiments, the scrap insulation board is positioned on feed conveyor 22 so that saw 24 cuts in the transverse direction across the scrap insulation board. In this way, slats are cut which have a longitudinal length equal to the transverse width of the scrap insulation board. In certain embodiments, the scrap insulation board may have a thickness of between approximately 0.5 inches and 4.5 inches (13-114 mm). In one or more embodiments, the slats may be cut at a width of between approximately 1.5 inches and 3.5 inches (38-89 mm), in other embodiments between approximately 2.0 inches and 3.0 inches (51-76 mm), and in other embodiments approximately 2.75 inches (69.8 mm).

Once a slat has been created by cutting assembly 16 it is automatically removed from the saw area and is placed in one of a plurality of guide channels 30 of pick and place assembly 18. Removal of the slat allows the scrap insulation board to be fed further into saw 24 by feed conveyor 22. Removal of the cut slat is controlled by the control system, and may be triggered by a sensor, or by the completion of a cutting pass of saw 24. A placement device 32 is provided adjacent to cutting assembly 16 to pick-up the cut slats and place them into guide channels 30. Placement device 32 may be any apparatus known to persons skilled in the art that is suitable for controlled movement of an object.

Figure 3:
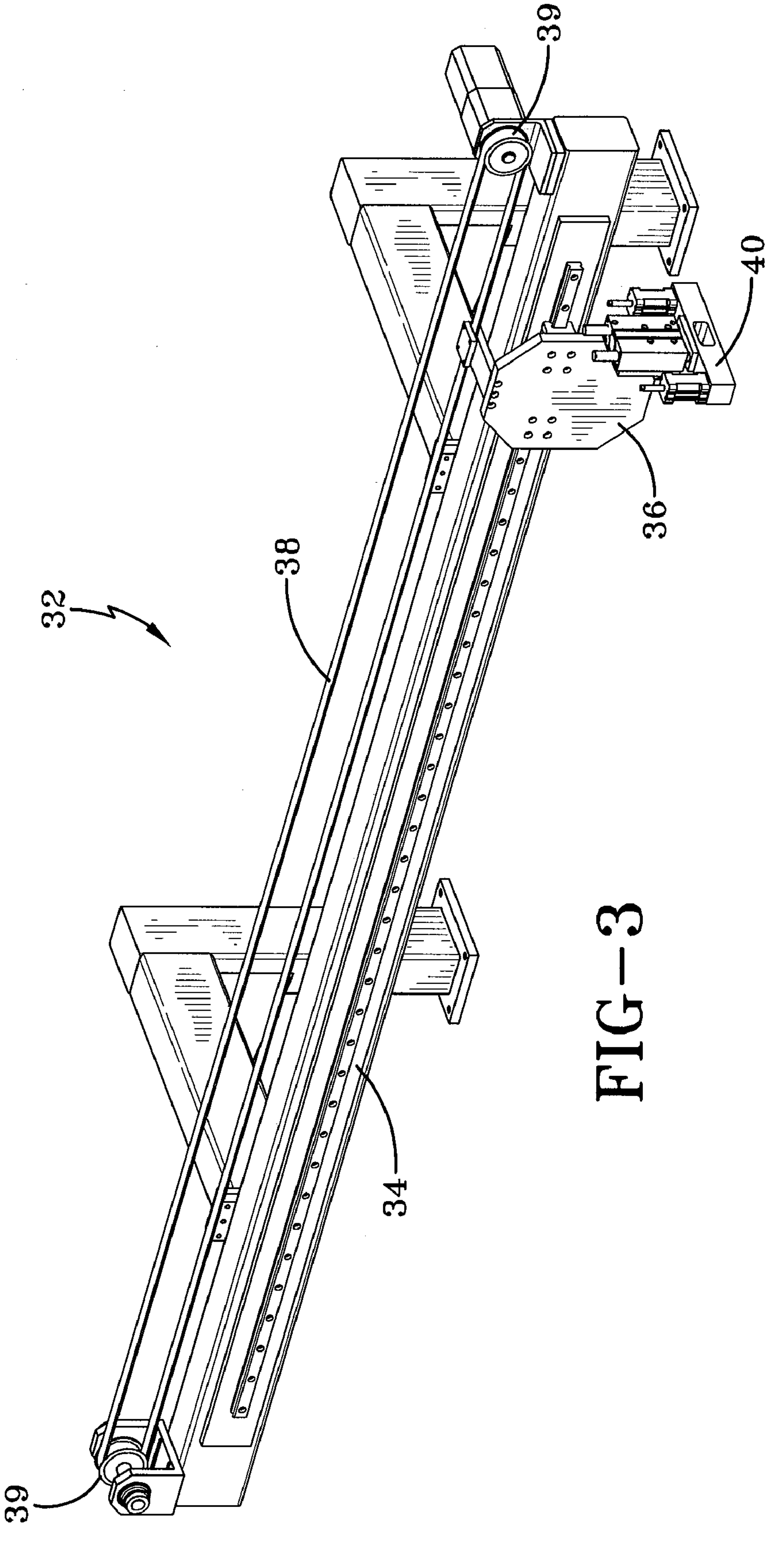
FIG. 3 is an enlarged perspective view of a slat placement device according to at least one embodiment of the present invention.

As shown in FIGS. 1 and 3, the placement device 32 as disclosed herein includes a rail 34 extending over and perpendicular with guide channels 30. In one or more embodiments, a carriage 36 is slidingly secured to rail 34 and is adapted to move linearly along the rail. Carriage 36 may also be engaged with a chain (or cable) 38, which is positioned around pulleys 39 located at opposite ends of rail 34. In one or more embodiments, one of the pulleys 39 is driven by a rotational force, such as, for example, by a reversible motor. The rotation of one of the pulleys causes chain 38 to traverse between and around pulleys, thereby causing linear movement of carriage 36 along rail 34.

A pick-up apparatus 40 is secured to carriage 36 and is adapted to pick-up the cut slats from the cutting assembly 16, and carry them to one of the plurality of guide channels 30.

Pick-up apparatus 40 may be any device known in the art capable of picking up the slats and carrying them to a guide channel. Pick-up apparatus 40 may have a plurality of forks that are adapted to spear the slat, and may also be vertically adjustable to raise and lower the slat as necessary. It is also contemplated that the pick-up apparatus may be adapted to orient the slat, if needed, to align with guide channels 30 in the longitudinal direction. This may be accomplished by any method known in the art.

In one or more embodiments, the slats are rotated so that the width of the slat, when cut, is oriented vertically in guide channels 30. Stated in another way, the top and bottom surfaces of the scrap insulation board become the vertical side surfaces of the slats once positioned in guide channels 30. Therefore, the slats, once positioned in guide channels 30, may have a height of between approximately 1.5 inches and 3.5 inches (38-89 mm), in other embodiments between approximately 2.0 inches and 3.0 inches (51-76 mm), and in other embodiments approximately 2.75 inches (69.8 mm). Rotation of the slats allows for a consistent vertical spacing dimension beneath the bundles of sheet material regardless of the thickness of the scrap insulation board used.

In one or more embodiments, a slat pusher (not shown) is provided in each guide channel 30. The slat pushers are positioned to push each slat within the guide channels 30 to a position beneath a bundle 12 positioned on a pop-up conveyor 42 (FIG. 1). Bundle 12 is carried to automated bundle processing assembly 10 and a pop-up conveyor 42 by a supply conveyor 45. In one or more embodiments, the slat pushers may be linear actuators located at one end of the guide channels. Suitable linear actuators are well known in the art and may include pneumatic, hydraulic, and screw driver linear actuators. In one or more embodiments, the linear actuators may each include an actuator rod, and a pushing block secured to the distal end of the actuator rod that is configured to engage the slats.

Figure 2:
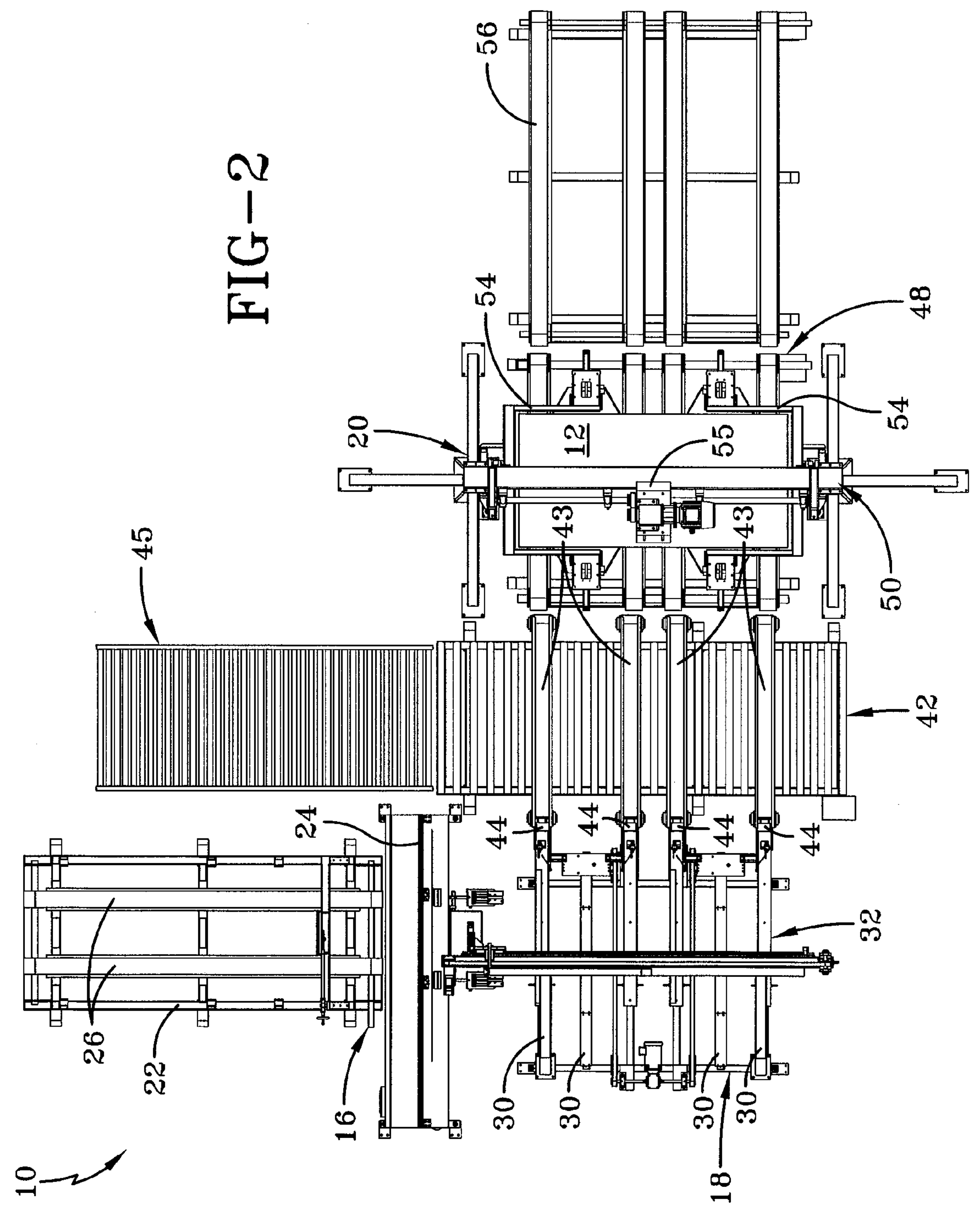
FIG. 2 is a top plan view of the automated stacking assembly of FIG. 1.

A glue head 44 is provided above and adjacent to each guide channel 30 to apply a bead of glue to each slat as it is pushed within the guide channels 30 by the slat pushers, as seen if FIGS. 1 and 2. The glue heads 44 may be of any known design, and may apply any type of glue known to those skilled in the art to the upper edges of the slats. In one or more embodiments, glue heads 44 may apply quick-setting glue to the edge of the slats as they are pushed beneath the glue heads 44. In certain embodiments, glue heads 44 may apply a hot-melt glue to the edge of the slats as they are pushed beneath the glue heads 44. After the slat pushers have reached their maximum stroke and have positioned the slats in the desired position beneath a bundle 12, they return to their original (un-actuated) position clear of guide channels 30, to await the next cycle of slats.

In one or more embodiments, guide channels 30 are aligned with pop-up channels 43 that extend transversely across pop-up conveyor 42 so that the slats may be positioned beneath a bundle 12 located on conveyor 42. When the slats are positioned within pop-up channels 43 beneath a bundle 12, with a bead of glue on one edge, they may then be raised so as to engage bundle 12. Each glued edge of a slat is pressed into contact with the bottom surface of bundle 12 by the pop-up channels 43 to secure the slats to the bundle 12. The slats may be pressed against the bottom surface of the bundle 12 for a predetermined amount of time to allow for the glue to at least partially dry. Once the slats have been adequately secured to bundle 12, pop-up channels 43 lower themselves to their original position to await the next cycle of slats.

A stacking assembly 20 may be provided adjacent to pop-up conveyor 42 and includes a conveyor 48 and a stacking tower 50. In one or more embodiments, conveyor 48 may be powered and may draw bundle 12 from pop-up conveyor 42 after the slats have been secured thereto. In one or more embodiments, stacking tower 50 includes tower channels 52 and lift members 54. Lift members 54 extend inwardly toward one another and are adapted to engage and support bundles 12. Each lift member 54 is received in a tower channel 52 and may be raised or lowered while sliding therein. In one or more embodiments, a system of chains (or cables) and pulleys is powered by a motor 55 to drive lift members 54.

In one or more embodiments, two bundles 12 are stacked together by stacking assembly 20 before being positioned for transport. Stacking tower 50 lifts a first bundle into the air, supported by lift members 54, to allow a second bundle to be positioned beneath the first bundle. When the second bundle has been positioned directly beneath the first bundle, the first bundle is then lowered to rest on top of the second bundle. The two stacked bundles are then moved away from stacking tower 50 by an unload conveyor 56, where they await retrieval by a forklift operator for storage or transport. This process is then repeated, so that the forklift operator is able to retrieve multiple bundles 12 without additional time or effort required. In one or more embodiments, two sets of stacked bundles may be positioned proximate to one another on unload conveyor 56, thereby allowing a forklift operator to retrieve four bundles at one time.

Various modifications and alterations that do not depart from the scope and spirit of this invention will become apparent to those skilled in the art. This invention is not to be unduly limited to the illustrative embodiments set forth herein.

The invention claimed is:

1. An automated process of preparing a bundle of sheet material for transport comprising:

- automatically cutting a plurality of slats from a continuously fed piece of material;
- automatically moving at least two of said slats into respective spaced apart guide channels;
- automatically applying glue to each said slat in each said guide channel;
- automatically positioning said slats into aligned pop-up channels under a bundle of sheet material;
- automatically pressing by said pop-up channels the glued surface of each said slat against the bottom of the bundle.

2. The automated process of claim 1, where the steps of automatically positioning said slats and automatically applying glue to said slats are performed simultaneously.

3. The automated process of claim 2, where the glue is applied to each said slat as it moves under a glue head positioned over the respective guide channel.

4. The automated process of claim 1, where the step of automatically cutting a slat from a piece of sheet material is performed using a single circular saw.

5. The automated process of claim 1, where the step of automatically positioning said slats under the bundle is performed only after at least two slats are positioned in the guide channels, and where the at least two slats are automatically positioned under the bundle simultaneously.

6. The automated process of claim 1, where the step of pressing the glued surface of said slats against the bottom of the bundle is accomplished by raising said slats against the bundle.

7. The automated process of claim 1, further comprising the step of automatically stacking the bundle on top of another bundle after the step of automatically pressing the glued surface of the slat against the bottom of the bundle.

8. The automated process of claim 7, further comprising the step of automatically moving the stacked bundles to an unload conveyor.

9. The automated process of claim 1, further comprising:

rotating each said slat after cutting so that the top and bottom surfaces of said piece of material become vertical side surfaces of said slats.

10. The automated process of claim 1, wherein said material is an insulation board having a facer, wherein said facer is one of said vertical side surfaces.

11. An automated method of preparing stacked sheet material for transport comprising:

providing pieces of a material, wherein said pieces are any thickness within a predetermined range of thicknesses;

providing a bundle of stacked sheet material;

automatically cutting slats from said pieces of a material, wherein said pieces of a material are cut to substantially the same width;

automatically rotating and placing the cut slats into one of a plurality of guide channels;

automatically applying glue to an edge of the slats;

automatically positioning the slats under the bundle from said plurality of guide channels; and automatically pressing the glued edge of the slat against the bottom of the bundle.

12. The automated method of claim 11, further comprising the step of automatically stacking the bundle on top of another bundle after the step of automatically pressing the glued edge of the slat against the bottom of the bundle.

13. The automated method of claim 12, further comprising the step of automatically moving the stacked bundles to an unload conveyor, where the stacked bundles are transported from the unload conveyor together.

14. The automated method of claim 12, where the step of automatically cutting slats from a piece of material is performed with a single circular saw blade cutting transversely across the piece of sheet material.

15. The automated method of claim 11, where the steps of automatically positioning the slats and automatically applying glue to the slats are performed simultaneously as the slats move within the guide channels.

16. The automated method of claim 11, where the glue is a hot-melt glue applied by glue heads positioned over the guide channels.

17. The automated method of claim 11, wherein said predetermined range of thickness is between 0.5 and 4.5 inches.

18. The automated method of claim 11 further comprising:

providing said material as an insulation board having a facer, wherein said facer is a vertical side surface of said slat after being rotated.

* * * * *